(12) United States Patent
Kim et al.

(10) Patent No.: US 12,308,476 B2
(45) Date of Patent: May 20, 2025

(54) BATTERY MODULE

(71) Applicant: SK ON CO., LTD., Seoul (KR)

(72) Inventors: Jae Hun Kim, Daejeon (KR); Hyeong Won Kim, Daejeon (KR); Sung Chel Yoon, Daejeon (KR); Ki Dong Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/415,661

(22) Filed: Jan. 18, 2024

(65) Prior Publication Data

US 2024/0283103 A1 Aug. 22, 2024

(30) Foreign Application Priority Data

Feb. 17, 2023 (KR) .................. 10-2023-0021714

(51) Int. Cl.
*H01M 50/533* (2021.01)
*H01M 50/507* (2021.01)
*H01M 50/54* (2021.01)

(52) U.S. Cl.
CPC ....... *H01M 50/533* (2021.01); *H01M 50/507* (2021.01); *H01M 50/54* (2021.01)

(58) Field of Classification Search
CPC ... H01M 50/533; H01M 50/54; H01M 50/507
See application file for complete search history.

(56) References Cited

U.S. PATENT DOCUMENTS

| | | | |
|---|---|---|---|
| 2019/0198952 A1* | 6/2019 | Choi | H01M 50/20 |
| 2020/0259152 A1 | 8/2020 | Lee et al. | |
| 2022/0181727 A1* | 6/2022 | Park | H01M 50/183 |

FOREIGN PATENT DOCUMENTS

| | | | | |
|---|---|---|---|---|
| CN | 109792014 A | 5/2019 | | |
| CN | 110233231 A | 9/2019 | | |
| CN | 111527626 A | 8/2020 | | |
| CN | 114883754 A | 8/2022 | | |
| KR | 10-2015-0103496 A | 9/2015 | | |
| KR | 20150103496 A | * | 9/2015 | .......... H01M 50/543 |
| KR | 10-2020-0062138 A | 6/2020 | | |

(Continued)

OTHER PUBLICATIONS

KR 20150103496 English Translation (Year: 2015).*

(Continued)

*Primary Examiner* — Jimmy Vo
(74) *Attorney, Agent, or Firm* — IP & T GROUP LLP

(57) ABSTRACT

The present disclosure relates to a battery module comprising: an electrode assembly capable of storing and supplying electrical energy; a battery exterior material accommodating the electrode assembly therein; a first tab portion electrically connected to the electrode assembly and protruding out of the battery exterior material along a first direction; a second tab portion extending along a first direction in which the first tab portion protrudes from a free end of the first tab portion and provided with a different length from a predetermined length of the first tab portion, based on a second direction perpendicular to a surface provided with the largest area among surfaces of the battery exterior material disposed along the first direction; and a bus bar assembly surrounding the second tab portion and electrically connected to the electrode assembly.

13 Claims, 12 Drawing Sheets

(56) References Cited

FOREIGN PATENT DOCUMENTS

KR  10-2020-0097510 A  8/2020
KR  10-2024-0128468 A  8/2024

OTHER PUBLICATIONS

Extended European Search Report for European Patent Application No. 24152089.9 issued by the European Patent Office on Jul. 18, 2024.
Office Action for U.S. Appl. No. 18/415,647 issued by the USPTO on Jun. 27, 2024.

\* cited by examiner

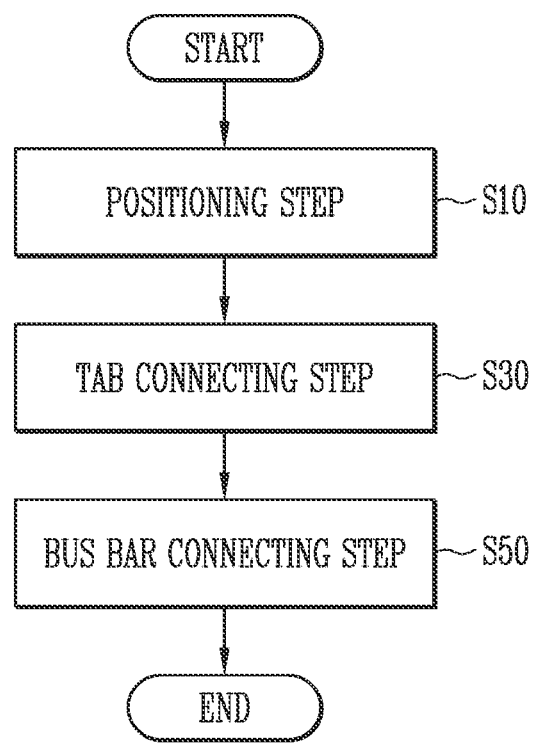

BATTERY MODULE

CROSS-REFERENCE TO RELATED PATENT APPLICATION

The present application claims priority under 35 U.S.C. § 119(a) to Korean patent application number 10-2023-0021714 filed on Feb. 17, 2023, in the Korean Intellectual Property Office, the entire disclosure of which is incorporated by reference herein.

BACKGROUND OF THE INVENTION

1. Field

The present invention relates to a battery module and a manufacturing method of the battery module. Specifically, it relates to a structural change of a battery cell and a battery module and a manufacturing method of the battery module using the same.

2. Description of the Related Art

As the electronics, communications, and space industries develop, demand for secondary batteries as an energy power source is drastically increasing. In particular, as the importance of global eco-friendly policies is emphasized, the electric vehicle market is growing swiftly, and research and development on secondary batteries are being actively conducted worldwide.

A secondary battery may be divided into battery cells, battery modules, and battery packs depending on the assembly unit. Due to tolerances occurring in the manufacturing process, the length of each battery cell may be different. When battery modules are manufactured, the length of battery cells needs to be uniform to stack them efficiently and improve the structural stability. In this process, a cut-bending process for adjusting the length between battery cells may be performed. There is a problem that the production speed is reduced and the production cost is increased due to the cut-banding process.

SUMMARY OF THE INVENTION

The problem that the present disclosure aims to solve is to manufacture battery cells having a uniform length and to provide a battery module including such battery cells.

Another problem that the present disclosure aims to solve is to provide a battery module with improved structural stability and energy density by stably coupling a bus bar assembly and battery cells.

Another problem that the present disclosure aims to solve is to provide an eco-friendly battery module in which a bus bar assembly and battery cells are joined without welding so that the bus bar assembly may be easily exchanged and the battery module is recyclable.

In addition, the present disclosure may be widely applied in the field of green technology, such as electric vehicles, battery charging stations, solar power generation, and wind power generation using batteries.

In addition, the present disclosure may be used in eco-friendly electric vehicles, hybrid vehicles, etc. to prevent climate change by suppressing air pollution and greenhouse gas emissions.

The battery module according to the present disclosure includes: a plurality of battery cells and a bus bar assembly electrically connecting the plurality of battery cells, wherein each of the plurality of battery cells includes an electrode assembly capable of storing and supplying electrical energy, a battery exterior material accommodating the electrode assembly therein, and an electrode lead including a first tab portion electrically connected to the electrode assembly and protruding out of the battery exterior material along a first direction, and a second tab portion extending along a first direction in which the first tab portion protrudes from a free end of the first tab portion and having a different shape from the first tab portion, and wherein the bus bar assembly includes a first bus bar body and a second bus bar body facing the first bus bar body and interposes at least a part of the second tab portion between the first bus bar body and the second bus bar body.

The second tab portion may be provided with a different length from the length of the first tab portion, based on a second direction perpendicular to a surface provided with the largest area among surfaces of the battery exterior material disposed along the first direction.

Based on the second direction, the length of the second tab portion may be equal to or longer than the first tab portion.

A free end of the first tab portion and one end of the second tab portion connected to the free end of the first tab portion may have the same length along a third direction perpendicular to the first direction and the second direction.

The length of a second tab portion along the third direction may be variable along the first direction.

The second tab portion may have a cylindrical shape extending along a third direction perpendicular to the first direction and the second direction.

The first bus bar body may include one or more insertion portions on one side of which at least a part is open along the third direction.

The first tab portion may be inserted into the one or more insertion portions.

Based on the second direction, the length of the second tab portion may be equal to or longer than the length of the insertion portion.

The first bus bar body may be positioned closer to the second tab portion than the battery exterior material.

The second bus bar body may include a seating portion that is concavely formed at a position corresponding to the second tab portion.

The battery module may further include a fastening member for coupling the first bus bar body and the second bus bar body, wherein the second bus bar body may be capable of pressurizing the first bus bar body through the fastening member.

Based on a third direction perpendicular to the first direction and the second direction, the first tab portion and the second tab portion may be formed to be equal to or shorter than the length of the battery exterior material.

A manufacturing method of a battery module according to the present disclosure, which is a manufacturing method of a battery module including an electrode assembly capable of storing and supplying electrical energy, a battery exterior material accommodating the electrode assembly therein, a first tab portion electrically connected to the electrode assembly and protruding out of the battery exterior material, and a second tab coupled to a free end of the first tab portion, includes: a positioning step for disposing, in a predetermined spacing, a second tab portion provided with a different length from a predetermined length of the first tab portion, based on a second direction perpendicular to a surface provided with the largest area among surfaces of the battery exterior material disposed along the first direction; a tab portion connecting step for positioning the preassembled electrode assembly, the battery exterior material, and the first tab portion in the spacing and connecting to the second tab portion; and a bus bar connecting step for coupling a bus bar assembly including a first bus bar body and a second bus bar body coupled to the first bus bar body to position the second tab portion between the second bus bar body and the first bus bar body.

The bus bar connecting step may include a step for positioning the first bus bar body between the battery exterior material and the second tab portion.

The bus bar connecting step may be characterized in that the first bus bar body moves along a third direction perpendicular to the first direction and the second direction so that a first tab portion is inserted into the first bus bar body.

The bus bar connecting step may further include a step for moving the first bus bar body along the first direction away from the battery exterior material to contact the second tab portion.

The bus bar connecting step may further include a step in which the second bus bar body interposes at least a part of the second tab portion therebetween to connect to the first bus bar body.

The step in which the second bus bar body interposes at least a part of the second tab portion therebetween to connect to the first bus bar body may be characterized in that the second bus bar body pressurizes the first bus bar body through a fastening member to fasten.

Through the present disclosure, battery cells having uniform length may be manufactured, and a battery module including such battery cells may be provided.

In addition, a battery module with improved structural stability and energy density by stably coupling a bus bar assembly and battery cells may be provided.

In addition, an eco-friendly battery module in which a bus bar assembly and battery cells are connected without welding so that the bus bar assembly may be easily exchanged and the battery module is recyclable may be provided.

BRIEF DESCRIPTION OF THE DRAWINGS

FIGS. 11 and 12 are flowcharts showing an example of a manufacturing method of a battery module according to the present disclosure.

DETAILED DESCRIPTION

Figure 1:
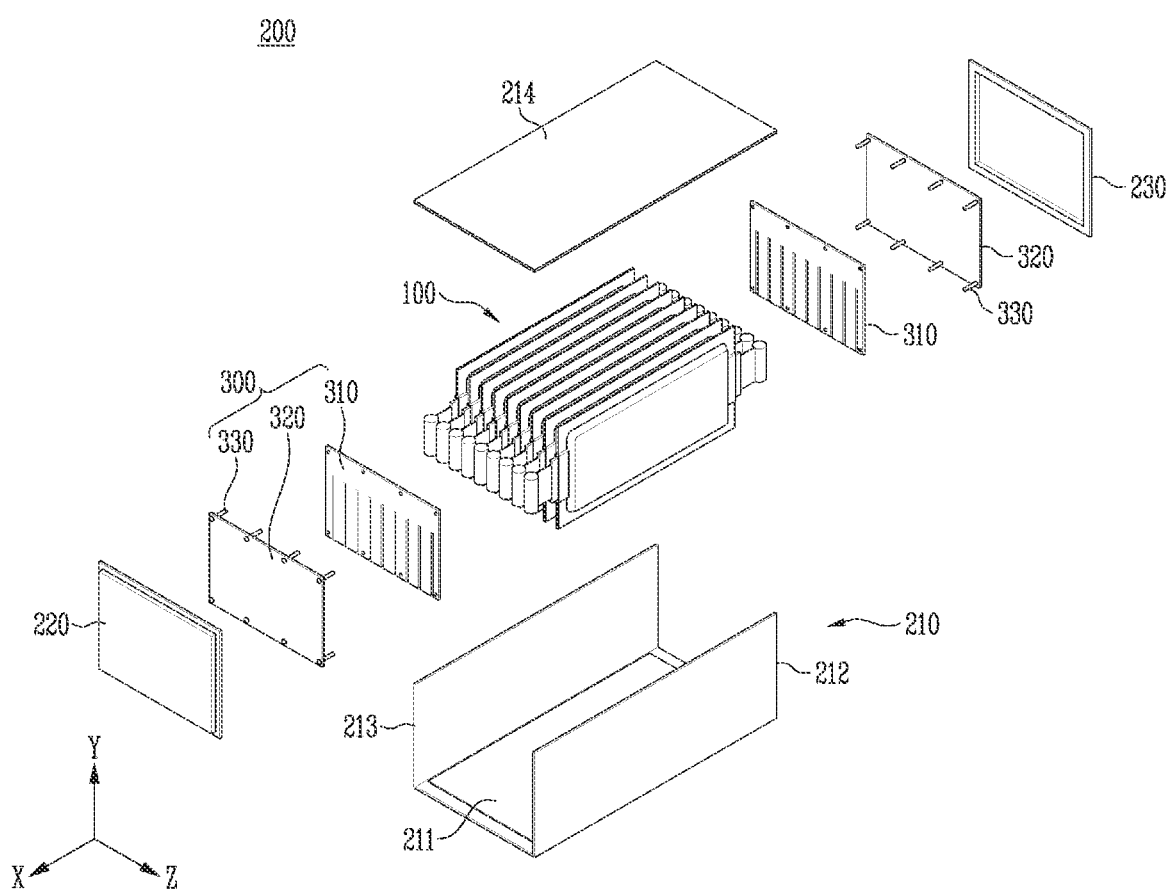
FIG. 1 is an exploded diagram of a battery module according to the present disclosure.

Hereinafter, preferred embodiments of the present disclosure will be described in detail with reference to the attached drawings. The configuration or control method of the device described below is only for explaining the embodiments of the present disclosure and is not intended to limit the scope of the present disclosure, and the same reference numerals used throughout the specification indicate the same components.

Specific terms used in this specification are merely for convenience of explanation and are not used to limit the illustrated embodiments.

For example, expressions such as "same" and "is the same" not only indicate a strictly identical state, but also indicate a state in which there is a difference in tolerance or the degree to which the same function is obtained.

For example, expressions representing relative or absolute arrangement such as "in a certain direction," "along a certain direction," "side by side," "perpendicularly," "at the center," "concentric," or "coaxial," not only strictly represent the arrangement, but also represent the state of relative displacement with a tolerance, or an angle or distance at which the same function is obtained.

To explain the present disclosure, it will be described below based on a spatial orthogonal coordinate system with X, Y, and Z axes orthogonal to each other. Each axis direction (X-axis direction, Y-axis direction, Z-axis direction) refers to both directions in which each axis extends.

The X-direction, Y-direction, and Z-direction mentioned below are for explanation so that the present disclosure may be clearly understood, and of course, the directions may be defined differently depending on where the reference is placed.

The use of terms such as 'first, second, and third' in front of the components mentioned below is only to avoid confusion about the components to which they are referred and is irrelevant to the order, importance, or master-slave relationship between the components, etc. For example, an invention that includes only a second component without a first component may also be implemented.

As used in this specification, singular expressions include plural expressions unless the context clearly dictates otherwise.

FIG. 1 is an exploded diagram of a battery module according to the present disclosure.

A battery cell described in this specification refers to a secondary battery that may be used repeatedly by charging and discharging electrical energy. For example, it may be a lithium secondary battery. However, a battery cell described in the present specification is not limited to a lithium secondary battery.

The main components of a battery cell are a cathode, an anode, and an electrolyte, and these main components are placed in a case (or pouch). A battery cell further includes an electrode lead protruding out of a case for electrical connection to the outside. An electrode lead may be connected to each of a cathode and an anode of a battery cell.

Meanwhile, the battery module described in the present specification refers to a battery assembly in which one or more of the battery cells are grouped and placed in a case to protect them from external shock, heat, vibration, etc. and to have high output and high capacity characteristics.

Referring to FIG. 1, a battery module 200 includes a cell assembly 100 consisting of a plurality of battery cells and a bus bar assembly 300 provided at both ends of the cell assembly 100 along the X direction to integrate and electrically connect the cell assembly 100. The battery module 200 includes a module housing 210, 214 accommodating a cell assembly 100 and a bus bar assembly 300.

A module housing 210, 214 includes a cell accommodating body 210 which is open at both ends along the X direction and which is in an angulated U-shape with an open upper surface or in a channel shape with an open upper portion. A module housing 210, 214 may further include a cell accommodating cover 214 coupled to an upper portion of a cell accommodating body 210 and a first cover 220 and a second cover 230 coupled to both ends of the cell accommodating body 210 opened based on the X direction.

Specifically, a cell accommodating body 210 may include a lower surface 211 facing one side of a cell assembly 100 and supporting the cell assembly 100, and a first side surface 212 and a second side surface 213 bent at both ends of a lower surface 211 and extending towards a cell accommodating cover 214.

Consequently, a module housing may be one sealed hexahedral shape in which two unbent side surfaces and an upper surface are coupled to a first cover 220, a second cover 230, and a cell accommodating cover 214, respectively, in a cell accommodating body 210. Being sealed does not mean that the inside and the outside are completely blocked. Being sealed means that the components inside a module housing are configured not to escape to the outside. For example, this may mean that battery cells inside a module housing do not escape to the outside.

A plurality of battery cells may be electrically connected by a bus bar assembly 300. A bus bar assembly 300 may include a first bus bar body 310 and a second bus bar body 320 connected to a battery cell. A first bus bar body may include a first bus bar (311 in FIG. 8) electrically connected to a battery cell and a first bus bar frame (312 in FIG. 8) for supporting a first bus bar body inside a battery module 200. A first bus bar body may be made of a metal or polymer with excellent electrical conductivity, and a first bus bar frame 312 may be made of an insulating material, but is not limited thereto.

A battery module 200 may further include a heat dissipation member with heat dissipation performance. A heat dissipation member may be a thermal pad or thermal adhesive. For example, a thermal pad may be interposed between a plurality of battery cells. The position of a thermal pad is not limited to this and may be included inside a battery module to improve heat dissipation function of the battery module. In addition, a thermal pad may be easily removed from an inside of a battery module. By including a thermal pad rather than a thermal adhesive, components of a battery module can be recycled, and the production cost can be reduced.

A typical electrode lead may be a plate of a flat shape. A plate may be inserted into a bus bar assembly 300 and welded to be fastened. The shape of an electrode lead may be changed to adjust assembly tolerances that occur when accommodating battery cells in a module housing. The shape of an electrode lead may be changed through cut-bending. The production speed may be reduced and the production cost may be increased due to a cut-banding process. However, in a battery module according to the present disclosure, assembly tolerances of battery cells can be easily adjusted by changing the shape of battery cells without performing a cut-banding process.

Figure 2:
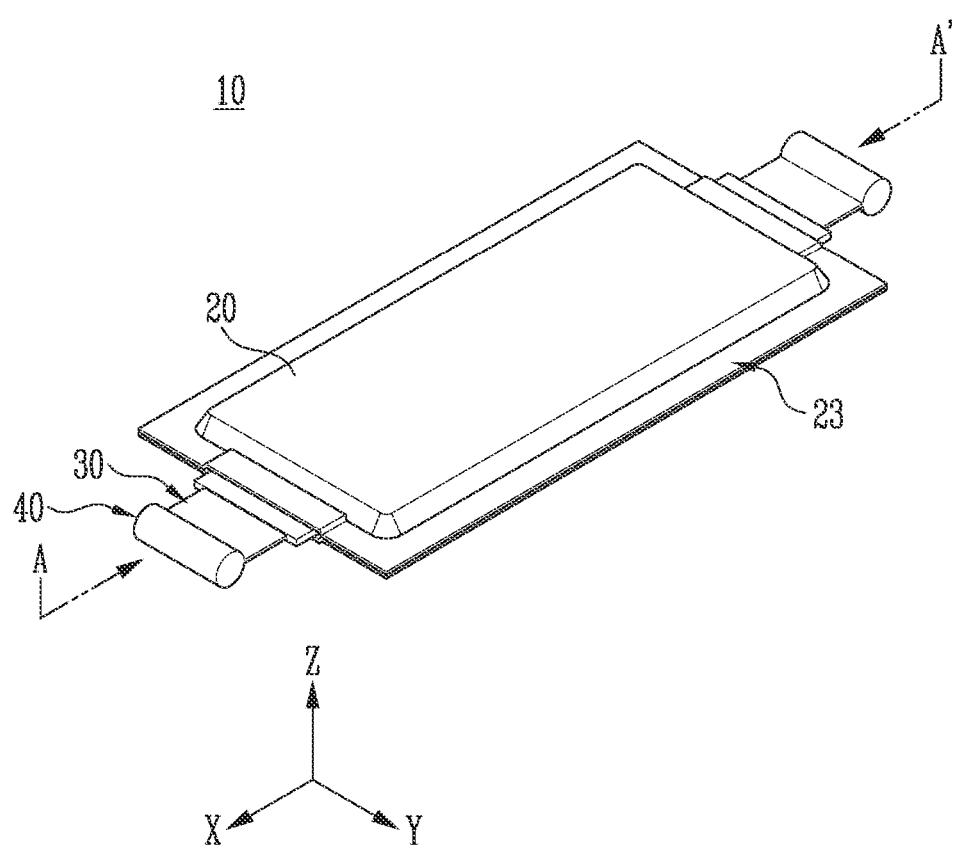
FIG. 2 is an example of a battery cell according to the present disclosure.
Figure 3:
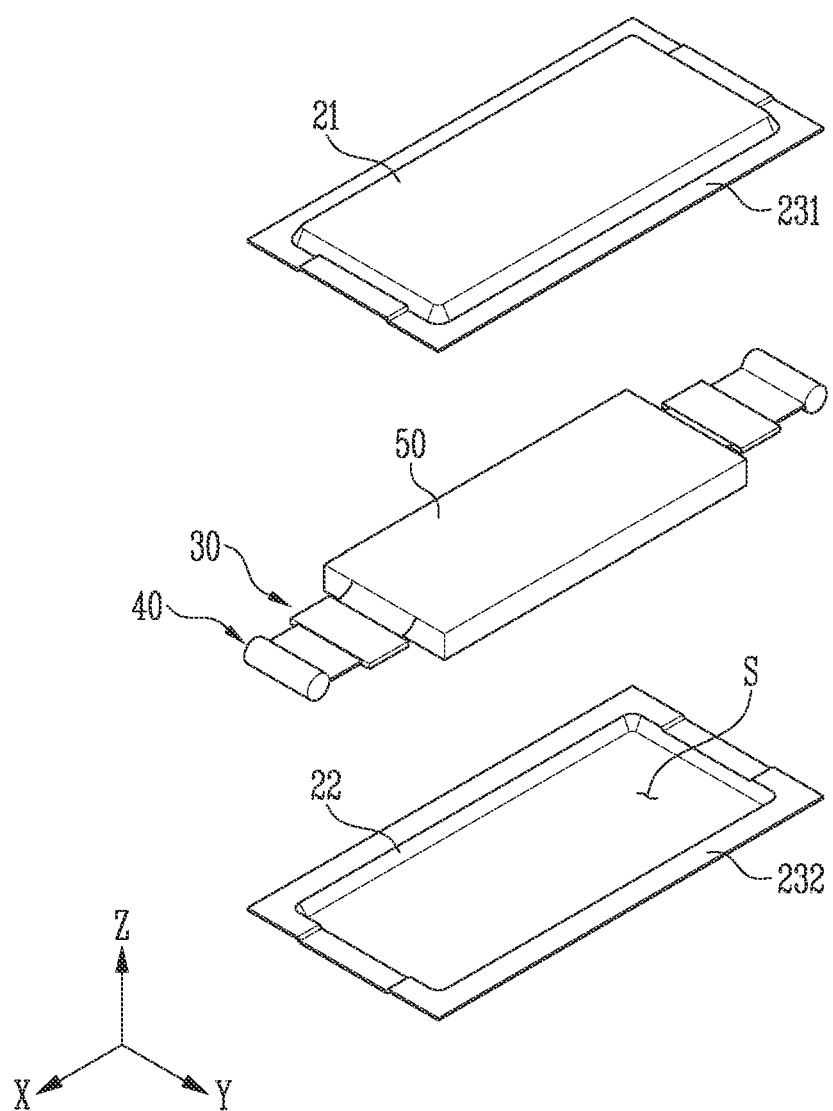
FIG. 3 is an exploded diagram of a battery cell according to the present disclosure.

FIG. 2 is an example of a battery cell according to the present disclosure; and FIG. 3 is an exploded diagram of a battery cell according to the present disclosure.

Battery cells 10 may be classified into a pouch-type secondary battery, a prismatic secondary battery, or a cylindrical secondary battery, depending on the shape of a secondary battery. In the present specification, a pouch-type secondary battery is illustrated as an example for convenience of explanation, but they are not limited thereto.

A battery cell 10 includes an electrode assembly capable of storing and supplying electrical energy, a battery exterior material accommodating the electrode assembly therein, and an electrode lead including a first tab portion electrically connected to the electrode assembly and protruding out of the battery exterior material and a second tab portion along a first direction in which the first tab portion protrudes extending from a free end of the first tab portion. An electrode lead may be electrically connected to a bus bar assembly.

A second tab portion may be provided with a different length from the length of a first tab portion, based on a second direction perpendicular to a surface provided with the largest area among surfaces of a battery exterior material disposed along a first direction.

Referring to FIG. 2, the X direction which is a direction in which a first tab portion 30 protrudes out of a battery interior material 20 is defined as a first direction; the Z direction which is a direction perpendicular to a surface that is extending along a first direction in which a first tab portion protrudes from a free end and that is provided with the largest area among surfaces of a battery exterior material disposed along a first direction is defined as a second direction; and the Y direction perpendicular to a first direction and a second direction is defined as a third direction.

A battery exterior material 20 may have a hexahedral shape. A battery exterior material 20 may accommodate an electrode assembly 50 therein. A battery exterior material 20 may include a metal layer for mechanical rigidity. Aluminum may be used as a material for a metal layer, but it is not limited thereto. A battery exterior material 20 may further include an insulating layer. An insulating layer may include an insulating material.

An electrode assembly 50 may be capable of storing and supplying electrical energy. An electrode assembly 50 may store electrical energy in the form of chemical energy, convert the chemical energy into electrical energy as needed, and supplies it to the outside of a battery.

An electrode assembly 50 may include a cathode and an anode. A cathode may include a cathode active material, and an anode may include an anode active material which lithium (Li) ions generated from a cathode active material may be inserted into and extracted from. In addition, a cathode and an anode may each further include a binder and a conductive material to improve mechanical stability and electrical conductivity.

An electrode assembly 50 may further include a separator. A separator may be configured to prevent electrical short circuit between a cathode and an anode to generate a flow of ions. The type of a separator is not particularly limited, but it may include a porous polymer film. An electrode assembly 50 may be manufactured by alternately stacking a plurality of cathodes and anodes and interposing a separator between a cathode and an anode by using a stacking, zigzag stacking, or winding method.

An electrode assembly 50 may further include an electrolyte allowing for migration of a cathode and an anode. For example, an electrolyte may include a lithium salt through which lithium ions may migrate. An electrolyte may be in a liquid state. Alternatively, an electrolyte may be in a solid state.

Referring to FIG. 3, a first tab portion 30 may be electrically connected to an electrode assembly 50. In addition, a first tab portion 30 may protrude out of an battery exterior material 20. The part where a first tab portion 30 is connected to an electrode assembly 50 refers to a fixed end of the first tab portion 30. The part where a first tab portion protrudes outwards refers to a free end of a first tab portion 30.

In an embodiment, a battery exterior material 20 may include an upper case 21 and a lower case 22. An upper case 21 or a lower case 22 may include an accommodating space S for accommodating an electrode assembly 50 therein. An upper case 21 and a lower case 22 may include sealing portions 231, 232 that are sealed along edges of each. When an electrode assembly 50 is accommodated in a battery exterior material 20, a first tab portion 30 may be electrically connected to an electrode assembly 50 and may protrude out of a case. A first tab portion 30 may be interposed between a sealing portion of a battery exterior material 20 and protrude outwards.

Referring to FIG. 3, a first tab portion 30 may be provided with a free end, which is an end region that is not fixed to an electrode assembly 50. A second tab portion 40 may be provided by extending from a free end of a first tab portion 30 along the X direction, which is a first direction. A second tab portion 40 may be electrically connected to a bus bar assembly 300, which will be described later.

Based on a third direction, a first tab portion 30 and a second tab portion 40 may be formed to be equal to or less than the length of a battery exterior material 20. When a first tab portion 30 and a second tab portion 40 exceed the length of a battery exterior material 20 along a third direction, the energy density and structural stability of a battery module 200 may be reduced.

Figure 4:
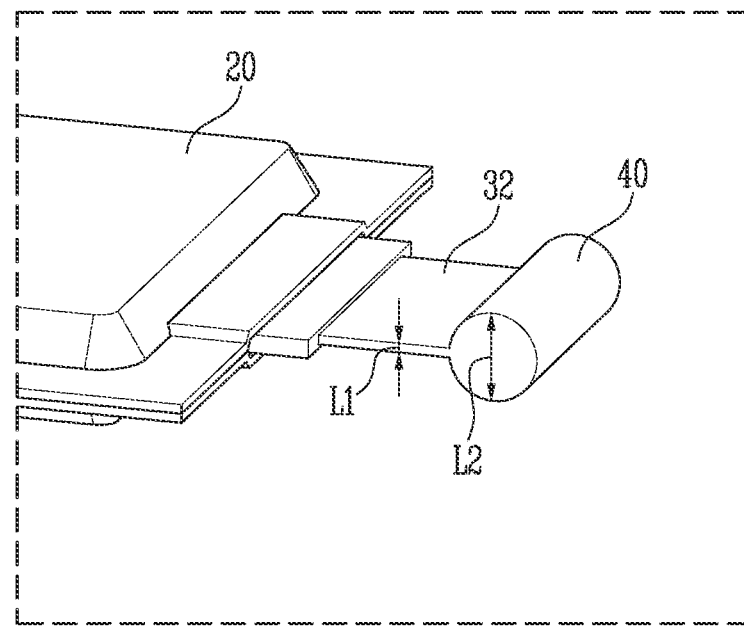
FIG. 4 is an enlarged diagram of a first tab portion and a second tab portion of a battery cell according to the present disclosure.
Figure 5:
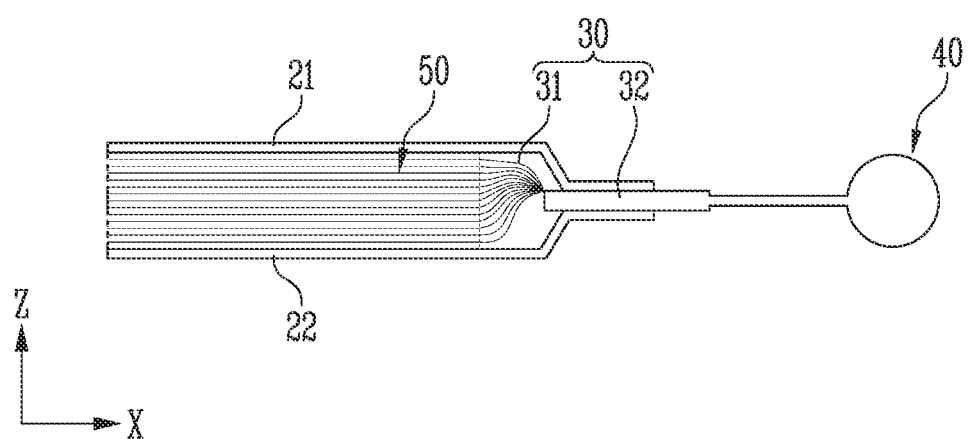
FIG. 5 shows a cross-section cut along line A-A' of FIG. 2.

FIG. 4 is an enlarged diagram of a first tab portion and a second tab portion of a battery cell according to the present disclosure; and FIG. 5 shows a cross-section cut along line A-A' of FIG. 2.

Referring to FIG. 4, a battery module 200 includes a second tab portion 40 provided with a different length from a predetermined length of a first tab portion, based on a second direction perpendicular to a surface provided with the largest area among surfaces of a battery exterior material disposed along a first direction. The length L2 of a second tab portion 40 may be provided to be different from the length L1 of a first tab portion 30 based on a second direction. Specifically, it may be provided to be different from the length L1 of a first tab plate 32. Through this, even when a first tab portion 30 is inserted into a bus bar assembly 300 and moves in a direction of a second tab portion 40, after a predetermined spacing is formed between bus bar assemblies, movement may be restricted. A surface provided with the largest area among surfaces of a battery exterior material may be one surface of a main room.

Referring to FIG. 5, a first tab portion 30 may further include an electrode tab 31 and a first tab plate 32. An electrode tab 31 may be connected to an electrode assembly 50. An electrode assembly 50 may include a cathode plate and an anode plate, and an electrode tab 31 may be connected to each of a cathode plate and an anode plate. A cathode plate and an anode plate may include an uncoated portion where an active material is not applied. One end of an electrode tab 31 may be positioned in an uncoated portion to be electrically connected to a cathode plate and an anode plate. The other end of an electrode tab 31 may be connected to a first tab plate 32. A first tab plate 32 may be interposed in a sealing portion 23 of a battery exterior material 20 to connect an inside and an outside of a battery exterior material 20. An end part of an area where a first tab plate 32 protrudes outwards may refer to a free end of a first tab portion 30.

FIG. 6A, FIG. 6B, FIG. 6C and FIG. 6D show various embodiments of a second tab portion.

Figure 6A:
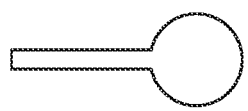
FIG. 6A, FIG. 6B, FIG. 6C and FIG. 6D show various embodiments of a second tab portion.
Figure 6B:
Figure 6C:
Figure 6D:
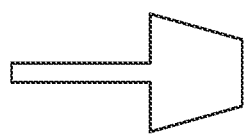

FIG. 6A, FIG. 6B, FIG. 6C and FIG. 6D show a cross-section of a second tab portion 40 cut along line A-A' of FIG. 2. Referring to FIG. 6A, FIG. 6B, FIG. 6C and FIG. 6D, a cross-section of a second tab portion 40 may be provided to be circular (FIG. 6A), rectangular (FIG. 6B), triangular (FIG. 6C), or trapezoidal (FIG. 6D). A second tab portion 40 may be provided in a pillar shape with a cross-section extending in a third direction. When a cross-section of a second tab portion 40 is circular, the second tab portion 40 may have a cylindrical shape extending along a third direction perpendicular to a first direction and a second direction.

Preferably, based on a second direction, the length of a second tab portion 40 may be formed to be equal to or longer than the length of a first tab portion 30. The length of a second tab portion 40 may be formed to be equal to or shorter than the length of a battery exterior material 20. Because of this, errors may not occur when battery cells are stacked.

A free end of a first tab portion 30 and one end of a second tab portion 40 connected to the free end of the first tab portion 30 may have the same length along a first direction and a third direction perpendicular to a second direction. In addition, the length of a second tab portion 40 along a third direction may be variable along a first direction.

Figure 7:
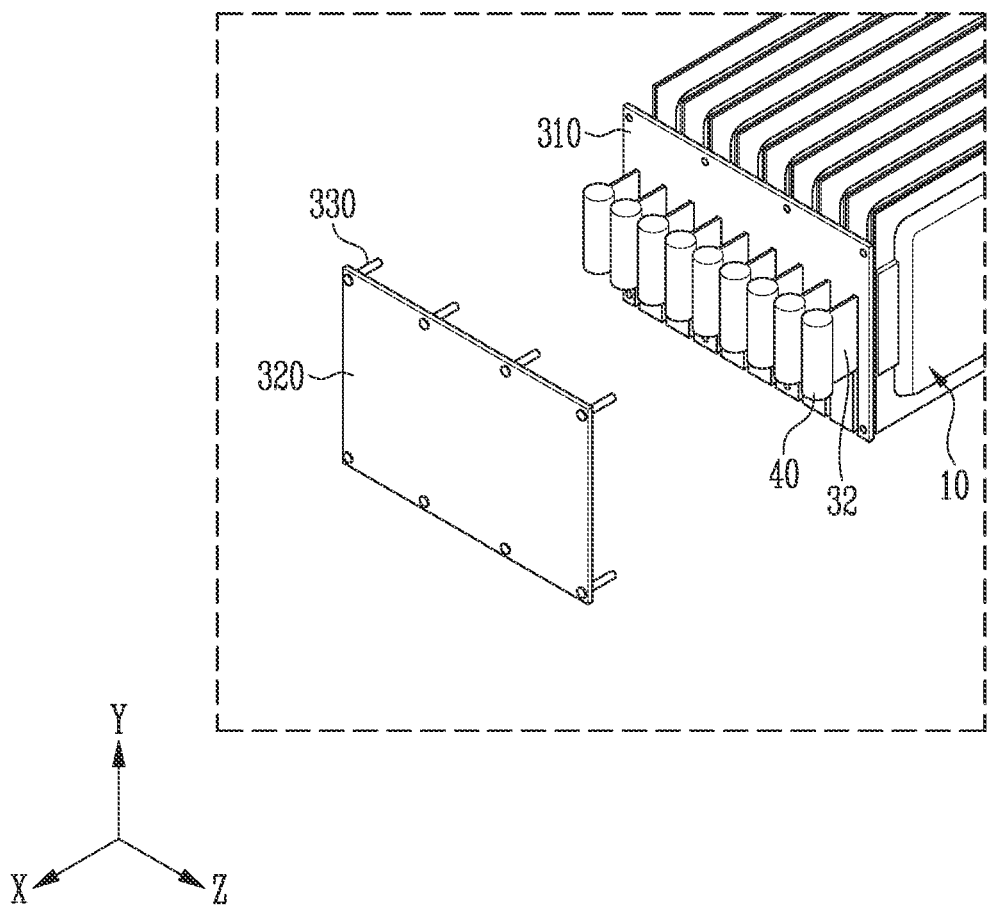
FIG. 7 shows a battery cell, a first bus bar body, and a second bus bar body.

FIG. 7 shows a battery cell, a first bus bar body, and a second bus bar body. A bus bar assembly 300 may include a first bus bar body 310 and a second bus bar body 320. A first bus bar body 310 and a second bus bar body 320 may be provided to face each other. At least a part of a second tab portion may be interposed between a first bus bar body and a second bus bar body. Referring to FIG. 7, a first bus bar body 310 may be positioned between a battery exterior material 20 and a second tab portion 40. A second bus bar body 320 may face a first bus bar body 310 to interpose at least a part of a second tab portion 40 therebetween. As illustrated, an entire second tab portion 40 may be interposed between a first bus bar body 310 and a second bus bar body 320. A second bus bar body may protect a first bus bar body from an external shock. A second bus bar body may include a material with high mechanical rigidity.

Figure 8:
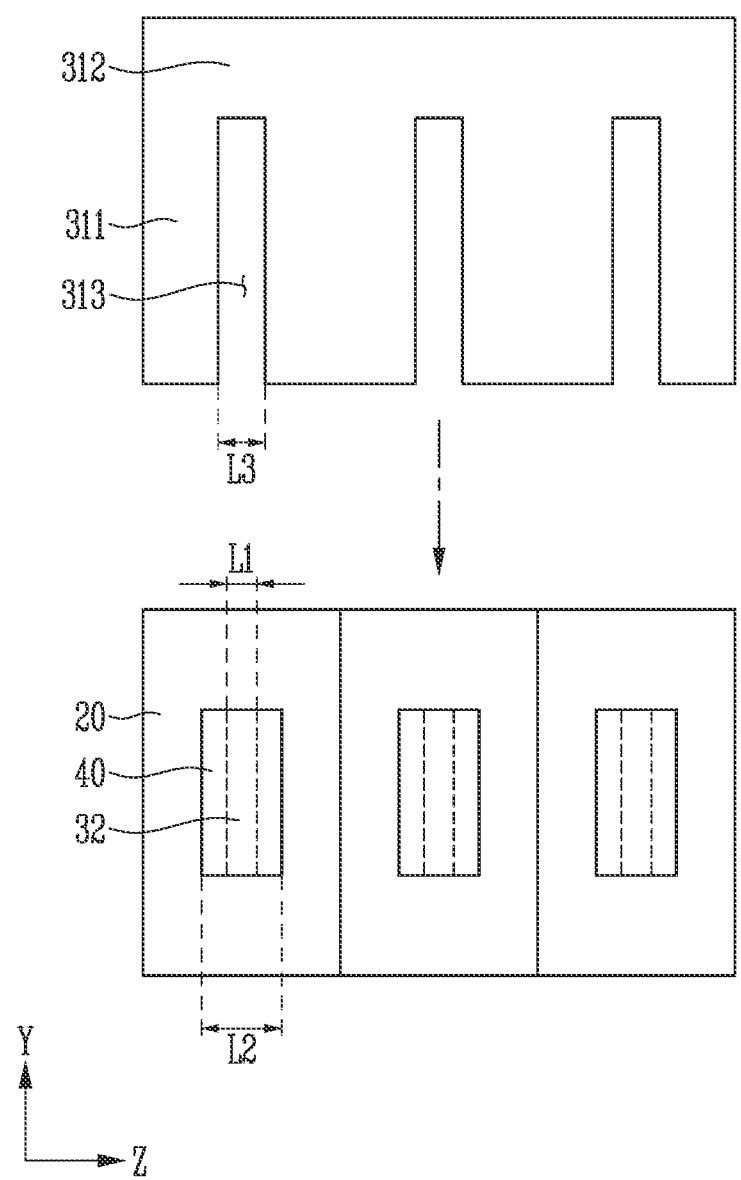
FIG. 8 shows a battery cell and a first bus bar body.

FIG. 8 shows a battery cell and a first bus bar body.

Referring to FIG. 8, a first bus bar body 310 may include one or more insertion portions 313 at least a portion of one side of which is open along a third direction. A first tab portion 30 may be inserted into one or more insertion portions 313. One side may be a side where a first bus bar body 310 meets a first tab portion 30. A first bus bar body 310 may be fastened by surrounding a first tab portion 30 through an insertion portion 313. Through this, the fastening stability between a battery cell 10 and a first bus bar body 310 may be improved. Referring to FIG. 8, a first bus bar body 310 may include an insertion portion 313 at least a part of which is open along the Y direction and may descend along the Y direction so that a first tab portion 30 may be inserted into an insertion portion 313. Based on a Z direction, the length L3 of an insertion portion 313 of a first bus bar body 310 may be formed to be equal to or longer than the length L1 of a first tab portion 30.

Based on a second direction, the length of a second tab portion 40 may be formed to be equal to or longer than the length of an insertion portion 313. Referring to FIG. 8, based on a second direction, the length L2 of a second tab portion 40 may be formed to be equal to or longer than the length L3 of an insertion portion 313.

A first bus bar body 310 may be positioned closer to a second tab portion 40 than a battery exterior material 20. In other words, a first bus bar body 310 may move forward to a second tab portion 40 along the X direction. A second tab portion 40 is disposed at a predetermined position in consideration of the length of a battery cell 10. As described above, battery cells may be accommodated in a module housing, and the length of battery cells must be uniform to improve energy density and structural stability of a battery module. The length of battery cells may be the length from the outermost side of one end to the outermost end of the other side of a battery cell. In an embodiment, the length of a battery cell 10 may be from the outermost side of a second tab portion 40 provided on one side surface of a battery cell 10 to the outermost side of a second tab portion 40 provided on the other side surface.

When a first bus bar body 310 moves forward to contact a second tab portion 40, a bus bar assembly 300 may be formed to be smaller than the length of a second tab portion 40 so that the movement may be restricted by a second tab portion 40.

Figure 9:
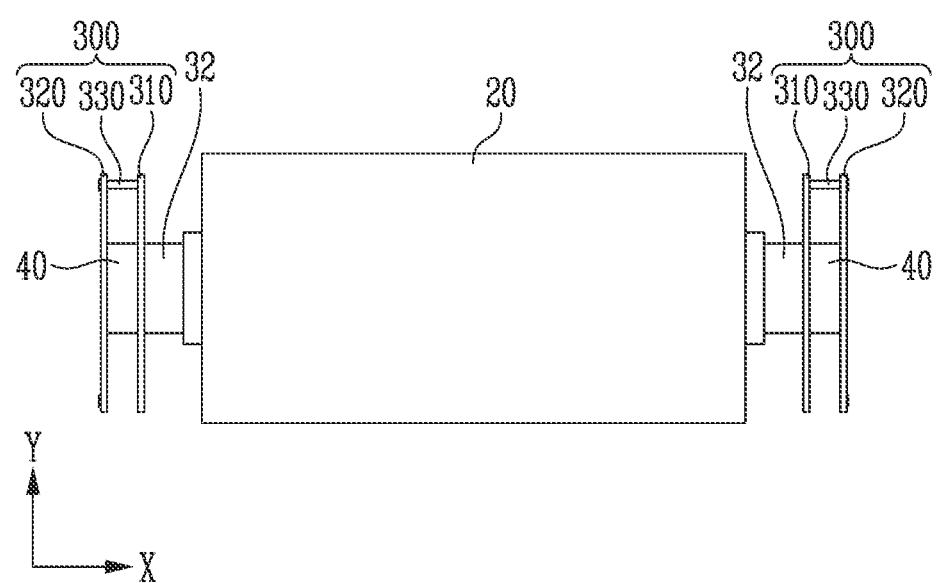
FIG. 9 shows a battery cell, a first bus bar body, and a second bus bar body coupled with each other.
Figure 10A:
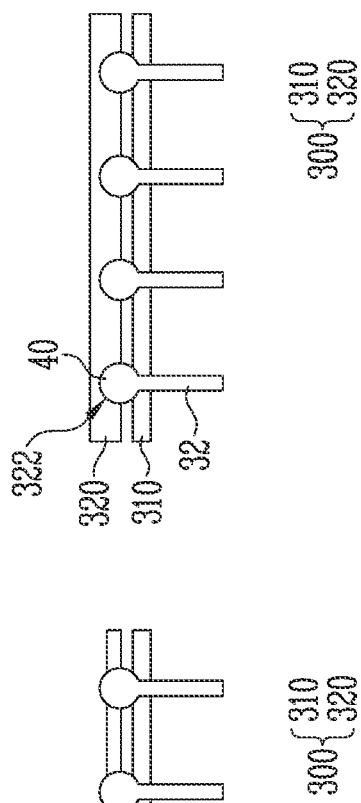
FIG. 10A, FIG. 10B and FIG. 10C show a first bus bar body and a second bus bar body coupled with each other according to another embodiment.
Figure 10B:
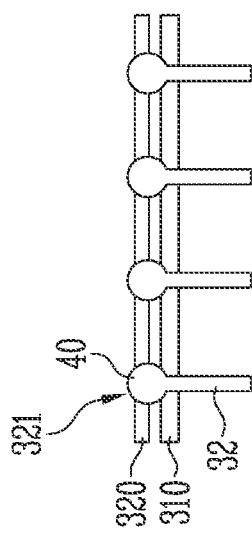
Figure 10C:
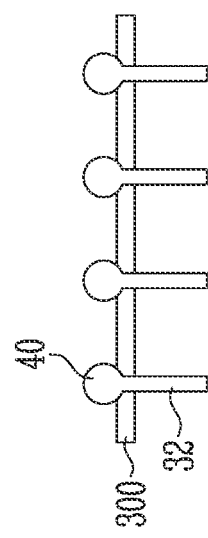

FIG. 9 shows a battery cell, a first bus bar body, and a second bus bar body coupled with each other; and FIG. 10A, FIG. 10B and FIG. 10C show a first bus bar body and a second bus bar body coupled with each other according to another embodiment.

Referring to FIG. 9, after a first tab portion is inserted into an insertion portion 313 of a first bus bar body 310, and a first bus bar body moves in the direction away from an battery exterior material along the X direction, a second bus bar body 320 may be connected to a first bus bar body 310.

A second bus bar body 320 may include a seating portion 322 that is concavely formed at a position corresponding to a second tab portion 40. A plurality of seating portions 322 may be provided. Through a seating portion, a second bus bar body 320 and a first bus bar body 310 may be coupled in a close contact, and the structural stability of a battery cell and a battery module may be increased.

A second bus bar body 320 may include a through-groove 321 of which one region is open. A through-groove may be provided in a region corresponding to one end of a second tab portion 40 so that a second tab portion 40 may be inserted into a through-groove 321. In an embodiment, when a second tab portion 40 is inserted through one side surface of a through-groove of a second bus bar body 320, at least a part of a second tab portion 40 may be exposed through the other side surface of the through-groove. Through this, the coupling stability of a first bus bar body 310 and a second bus bar body 320 may be improved, and at the same time, whether a second tab portion is damaged may be visually confirmed.

A bus bar assembly 300 may further include a fastening member 330. Through a fastening member 330, a second bus bar body 320 and a first bus bar body 310 may be pressurized to be fastened. Through pressurized fastening, the structural stability of battery cells may be increased, and the electrical connectivity between battery cells and a bus bar assembly may be improved.

A fastening member 330 may be positioned between a first bus bar body 310 and a second bus bar body 320. A fastening groove may be provided in one of a first bus bar body 310 and a second bus bar body 320. In an embodiment, a fastening member may penetrate a second bus bar body 320 to be connected to a first bus bar body 310. A fastening member may be a bolt.

Figure 12:
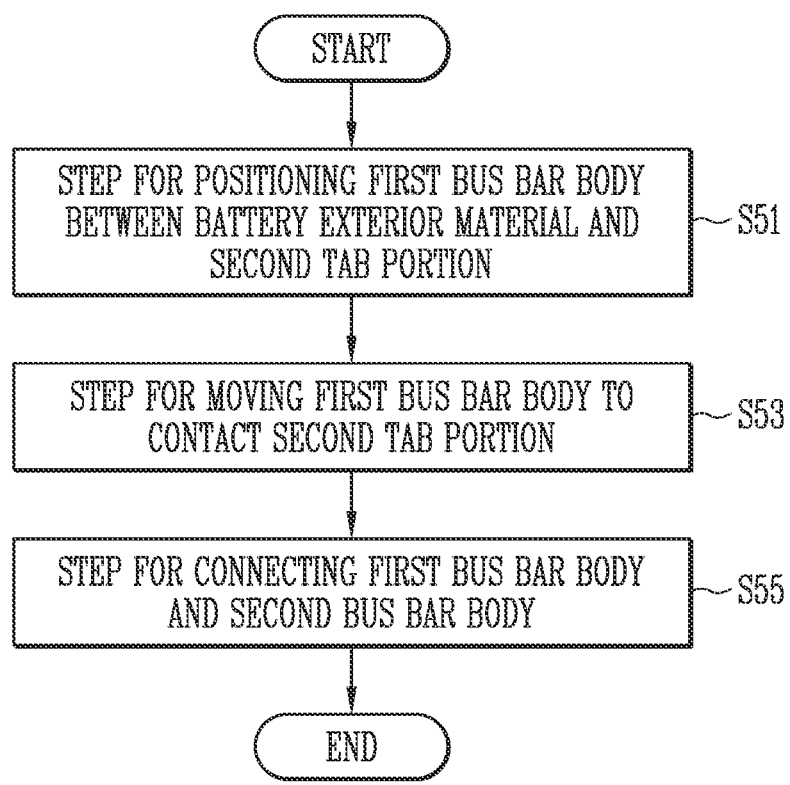

FIGS. 11 and 12 are flowcharts showing an example of a manufacturing method of a battery module according to the present disclosure.

Referring to FIGS. 11 and 12, a manufacturing method of a battery module according to the present disclosure, which is a manufacturing method of a battery module including an electrode assembly capable of storing and supplying electrical energy, a battery exterior material accommodating an electrode assembly therein, a first tab portion electrically connected to an electrode assembly and protruding out of a battery exterior material, and a second tab coupled to a free end of the first tab portion, includes: a positioning step S10 for disposing, in a predetermined spacing, a second tab portion provided with a different length from a predetermined length of a first tab portion, based on a second direction perpendicular to a surface provided with the largest area among surfaces of a battery exterior material disposed along a first direction; a tab portion connecting step S39 for positioning a preassembled electrode assembly, a battery exterior material, and a first tab portion in the spacing and connecting to the second tab portion; and a bus bar connecting step S50 for coupling a bus bar assembly including a first bus bar body and a second bus bar body coupled to a first bus bar body to position a second tab portion between a second bus bar body and a first bus bar body.

The predetermined spacing of a second tab portion 40 is a value determined in consideration of the length of a battery cell 10. When a second tab portion 40 is positioned at both ends of a battery cell 10, and a spacing of a second tab portion 40 is determined, the length of a battery cell 10 may be determined. In other words, when a second tab portion 40 is disposed in a predetermined spacing, a plurality of battery cells 10 will be manufactured to have a uniform length.

A manufacturing method of a battery module according to the present disclosure may include a tab connecting step S30 for positioning a preassembled electrode assembly 50, a battery exterior material 20, and a first tab portion 30 in a predetermined spacing and connecting to a second tab portion. While an electrode assembly 50 is accommodated in a battery exterior material 20, and an electrode assembly 50 and a first tab portion 30 are electrically connected, a first tab portion 30 may be disposed in a shape protruding out of a battery exterior material 20. At this time, a free end of a first tab portion 30 and a second tab portion 40 may be connected.

Different from the steps described above, a manufacturing method according to the present disclosure may include a step for manufacturing a second tab portion 40 through an additional process after manufacturing battery cells 10 including a first tab portion 30. In an embodiment, a second tab portion 40 may be manufactured by cutting a first tab portion 30 through a tailor roll method. The thickness of a first tab portion 30 may be adjusted through the tailor roll method. In this case, a positioning step S10 for disposing a second tab portion in a predetermined spacing may be omitted.

The battery module manufacturing method according to the present disclosure may include a bus bar connecting step S50 for coupling a bus bar assembly including a first bus bar body and a second bus bar body coupled to a first bus bar body to position a second tab portion between a second bus bar body and a first bus bar body. As described above, at least a part of a second tab portion may be interposed between a first bus bar body 310 and a second bus bar body 320 to be connected so that a welding step may be omitted. Through this, some components of a battery module can be easily replaced, and the production cost may be reduced so that an eco-friendly battery module may be manufactured.

A bus bar connecting step S50 may include a step S51 for positioning a first bus bar body between a battery exterior material and a second tab portion. In a step for positioning a first bus bar body 310 between a battery exterior material 20 and a second tab portion 40, a first tab portion 30 will be inserted into a first bus bar body 310.

A step S51 for positioning a first bus bar body 310 between a battery exterior material 20 and a second tab portion 40 may be characterized in that a first bus bar body 310 moves towards a first tab portion 30 along a third direction so that a first tab portion 30 is inserted into a first bus bar body 310. A first bus bar body 310 may be provided with an insertion portion 313 in which at least a part of one side is open so that a first tab portion 30 is inserted. A first tab portion 30 will be inserted into an insertion portion 313.

A bus bar connecting step S50 may further include a step S53 for moving a first bus bar body 310 in a direction away from a battery exterior material 20 along a first direction to contact a second tab portion 40. A first bus bar body 310 may move to come into close contact with a second tab portion 40 while a first tab portion 30 is inserted.

A bus bar connecting step S50 may further include a step S55 in which a second bus bar body interposes at least a part of a second tab portion therebetween to be connected to a first bus bar body. Through this, a battery cell 10 and a bus bar assembly 300 may be electrically connected without welding.

In a bus bar connecting step S50, a step S55 in which a second bus bar body interposes at least a part of a second tab portion therebetween to be connected to a first bus bar body may be characterized in that a second bus bar body pressurizes a first bus bar body through a fastening member to fasten. Through this, a first bus bar body 310 and a second bus bar body 320 may be stably coupled to improve the stability of a battery module and improve the electrical connectivity between a bus bar assembly 300 and a battery cell 10.

The present disclosure may be modified and implemented in various forms, and its scope is not limited to the embodiments described above. Therefore, if a modified embodiment includes components of the present disclosure, it should be regarded as falling within the scope of the rights of the present disclosure.

What is claimed is:

1. A battery module comprising:
a plurality of battery cells and a bus bar assembly electrically connecting the plurality of battery cells,
wherein each of the plurality of battery cells includes an electrode assembly capable of storing and supplying electrical energy;
a battery exterior material accommodating the electrode assembly therein; and
an electrode lead including a first tab portion electrically connected to the electrode assembly and protruding out of the battery exterior material along a first direction, and a second tab portion extending along the first direction in which the first tab portion protrudes from a free end of the first tab portion and having a different shape from the first tab portion, and
wherein the bus bar assembly includes a first bus bar body and a second bus bar body facing the first bus bar body along the first direction and interposes at least a part of the second tab portion between the first bus bar body and the second bus bar body, and
wherein the first bus bar body is electrically connected to the first tab portion and the second bus bar body is electrically connected to the second tab portion.

2. The battery module according to claim 1, characterized in that the second tab portion is provided with a different length from a length of the first tab portion, based on a second direction perpendicular to a surface provided with the largest area among surfaces of the battery exterior material disposed along the first direction.

3. The battery module according to claim 2, characterized in that based on the second direction, the length of the second tab portion is equal to or longer than the first tab portion.

4. The battery module according to claim 2, characterized in that the free end of the first tab portion and one end of the second tab portion connected to the free end of the first tab portion have the same length along a third direction perpendicular to the first direction and the second direction.

5. The battery module according to claim 4, characterized in that the length of the second tab portion along the third direction is variable along the first direction.

6. The battery module according to claim 2, characterized in that the second tab portion has a cylindrical shape extending along a third direction perpendicular to the first direction and the second direction.

7. The battery module according to claim 2, characterized in that the first bus bar body includes one or more insertion portions on one side of which at least a part is open along a third direction perpendicular to the first direction and the second direction.

8. The battery module according to claim 7, characterized in that the first tab portion is inserted into the one or more insertion portions.

9. The battery module according to claim 7, characterized in that the length of the second tab portion is equal to or longer than a length of the insertion portion.

10. The battery module according to claim 1, characterized in that the first bus bar body is positioned closer to the second tab portion than the battery exterior material.

11. The battery module according to claim 1, characterized in that the second bus bar body includes a seating portion that is concavely formed at a position corresponding to the second tab portion.

12. The battery module according to claim 1, further comprising a fastening member for coupling the first bus bar body and the second bus bar body, wherein the second bus bar body is capable of pressurizing the first bus bar body through the fastening member.

13. The battery module according to claim 2, characterized in that based on a third direction perpendicular to the first direction and the second direction, the first tab portion and the second tab portion are formed to be equal to or shorter than a length of the battery exterior material.

* * * * *